United States Patent [19]

May

[11] Patent Number: 4,862,500
[45] Date of Patent: Aug. 29, 1989

[54] TELEPHONE JACK LOCK-OUT PLUG
[75] Inventor: Donald M. May, Newhall, Calif.
[73] Assignee: May Engineering Company, Newhall, Calif.
[21] Appl. No.: 194,105
[22] Filed: May 16, 1988
[51] Int. Cl.$^4$ .............................................. H04M 1/66
[52] U.S. Cl. ..................................... 379/445; 439/133
[58] Field of Search ................ 379/445; 439/133, 135, 439/148, 304, 306; D13/28

[56] References Cited

U.S. PATENT DOCUMENTS

| | | | |
|---|---|---|---|
| 1,310,138 | 7/1919 | Sargent | 439/133 |
| 4,311,883 | 1/1982 | Kidney | 379/443 |

*Primary Examiner*—Jin F. Ng
*Assistant Examiner*—Randall S. Vaas
*Attorney, Agent, or Firm*—Kelly, Bauersfeld & Lowry

[57] ABSTRACT

A lock-out plug is provided for preventing unauthorized use of a telephone by preventing connection thereof to an operative telephone jack. The lock-out plug comprises a compact plug fitting having a size and shape to fit snugly into an open receptacle of a standard modular type telephone outlet jack. An angularly set threaded bore is formed within the plug fitting such that a forward end of the bore is disposed within the telephone receptacle and a rearward end of the bore is exposed to the exterior of the receptacle when the plug fitting is seated therein. A set screw is received within the bore and includes a forward end locking tip for binding engagement with a side wall of the telephone jack to lock the plug fitting in place and thereby prevent unauthorized connection of a telephone to the jack. The head of the set screw is accessible from the exterior of the jack preferably by engagement with a specialized tool to advance or retract the locking tip relative to the jack side wall.

5 Claims, 1 Drawing Sheet

TELEPHONE JACK LOCK-OUT PLUG

BACKGROUND OF THE INVENTION

This invention relates generally to apparatus for controlling use of electrical equipment, such as telephones, computers, and the like utilized to send and receive communications over standard telephone lines. More particularly, this invention relates to a relatively simple and easy-to-use lock-out plug for positively preventing connection of a telephone or the like to an associated telephone outlet jack.

Modern homes and businesses commonly include one or more telephones used for a wide variety of personal and business communication purposes. In addition, in recent years, computers have been increasingly used to send and receive information using standard telephone lines. In either case, the communication device is normally connected to a relatively standardized, so-called modular telephone outlet jack by means of a compact plug designed for mating fit into an open jack receptacle. The connecting plug is mounted at one end of a conductive cord coupled in turn to the communication device, and functions to link the communication device through the jack to the telephone lines and related telephone communication system.

In some instances, it is desirable to disable a telephone or other communication device on a temporary basis. For example, it is sometimes desirable to prevent unauthorized telephone usage at a particular business location or the like, or to prevent children from making unauthorized telephone calls to undesired parties or which might incur objectionable toll fees. Still further, it is sometimes necessary to prevent unauthorized use of a computer to send and receive data over telephone lines to avoid incurring undesired telephone toll charges.

In the past, the problem of unauthorized telephone usage has normally been addressed by removing the telephone instrument from the associated outlet jack, and storing the telephone instrument in a suitably locked location or the like. While disconnection of the telephone instrument is performed quickly and easily with modern modular connector fittings, the outlet jack remains operatively connected to the telephone lines. The portability and compactness of the modern telephones permits an unauthorized user to reconnect a different telephone instrument with the jack in an equally quick and easy manner. Accordingly, disconnection of the telephone instrument from the otherwise operational outlet jack has proven to be a generally ineffective technique to prevent unauthorized telephone usage.

Alternative techniques have utilized various mechanical lock devices mounted directly upon the telephone instrument to prevent manipulation of the telephone dialing mechanisms. However, these devices are easily defeated by simple removal of the inhibited telephone instrument from the associated outlet jack, and replacement with a different telephone having an unconstrained dialing mechanism.

There exists, therefore, a significant need for a relatively simple, economical, and easy-to-use device for preventing unauthorized use of a telephone or other communication device on a temporary basis. The present invention fulfills this need and provides further related advantages.

SUMMARY OF THE INVENTION

In accordance with the invention, a relatively simple and easy-to-use lock-out plug is provided for preventing unauthorized connection of a telephone or other communication device to a standard telephone outlet jack. The lock-out plug comprises a lightweight and compact plug fitting having a size and shape for mating reception into an open receptacle of a standard telephone outlet jack. A set screw is carried by the plug fitting for releasable locking engagement with a side wall of the receptacle. In this way, the plug fitting may be securely locking into the receptacle in a position blocking insertion of a standard connector plug, thereby correspondingly preventing unauthorized use of the telephone or other communication device.

In the preferred form of the invention, the compact plug fitting is constructed from molded plastic or the like to have a generally rectangular cross sectional size and shape to fit snugly into the open cavity of a standard telephone outlet jack receptacle. A set screw is carried by the plug fitting within an angularly set threaded bore to have a forward end locking tip projecting into secure binding engagement with a side wall of the jack receptacle. However, when the plug fitting is received into the jack receptacle, a head of the set screw at the rear end thereof is exposed within the bore to the exterior of the jack. With this construction, a suitable tool or key may be engaged with the set screw to advance or retract the locking tip thereof relative to the receptacle side wall. A specialized head geometry is desirably provided on the set screw for operation by the tool having a similar specialized or nonstandard geometry, thereby preventing set screw operation through the use of standard workshop tools.

In one alternative form of the invention, the compact plug fitting may comprise a conductive link adapted for plug-in reception into a cavity for normally rendering the associated circuit operational. In this embodiment, the plug fitting again carries the set screw within an angularly set threaded bore for external exposure of the set screw head when the locking tip bindingly engages a side wall of the cavity to lock the plug fitting in place. A specialized set screw head and related tool geometry are again provided in the preferred form to prevent plug fitting removal by the use of a standard workshop tool.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
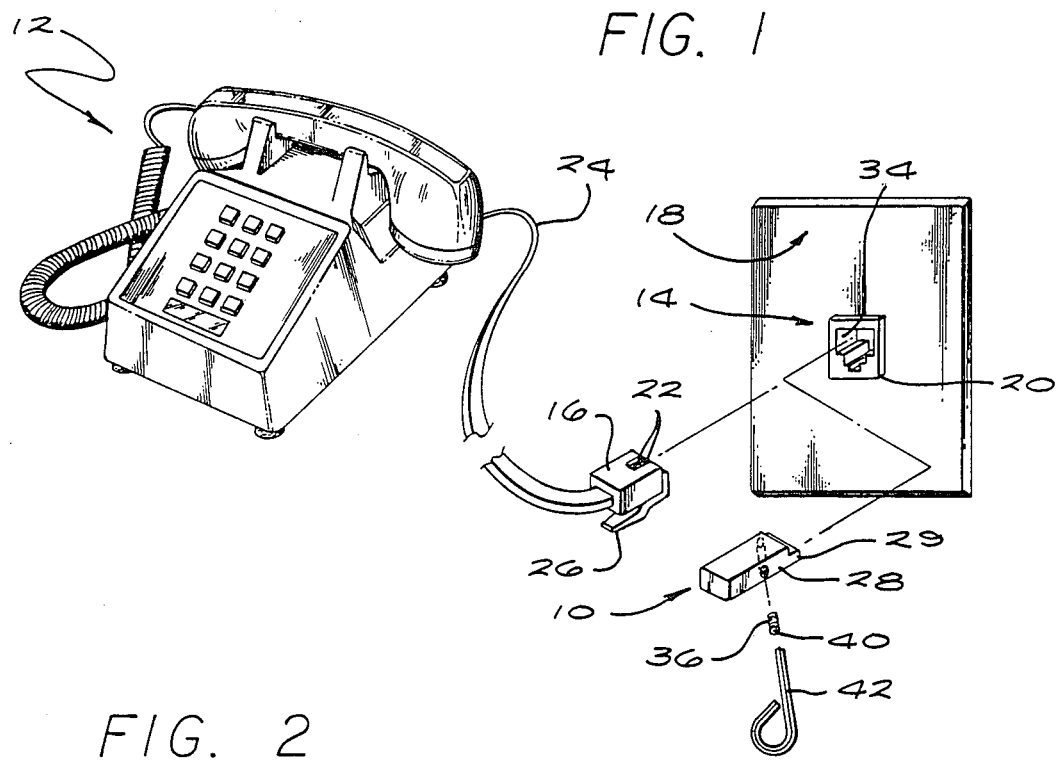
FIG. 1 is an exploded perspective view illustrating a preferred form of a lock-out plug embodying the novel features of the invention.

As shown in the exemplary drawings, a relatively simple and easy-to-use lock-out plug referred to generally by the reference numeral 10 is provided for preventing connection of a telephone instrument 12 or other communication device to a standard telephone outlet jack 14. The lock-out plug 10 is designed to positively lock with the jack 14 in a manner preventing unauthorized removal therefrom, thereby preventing connection of the telephone instrument 12 to the jack 14 by means of a standard connector fitting 16. While a conventional telephone instrument 12 is depicted in FIG. 1, it will be understood that the invention also functions to prevent connection of other types of communication devices, such as computers and the like, to the outlet jack 14.

As shown in FIG. 1, a standard, so-called modular type telephone outlet jack 14 normally includes a wall plate 18 or the like adapted for installation onto a suitable support wall (not shown). The wall plate 18 supports a jack receptacle 20 comprising a forwardly open cavity having a rear wall thereof including exposed conductor elements providing a link to standard telephone communication lines. The jack receptacle is sized and shaped for relatively close sliding reception of the standard connector fitting 16 which includes additional exposed conductor elements 22 coupled to the telephone instrument 12 via a suitable cord 24. When the connector fitting 16 is seated into the jack receptacle 20, the conductor elements 22 on the fitting 16 are suitably connected to the conductor elements within the receptacle 20 to render the telephone operational, all in a manner well known to those skilled in the art. A spring lever 26 on the connector fitting 16 normally locks the the receptacle to hold the fitting in place during normal operation. However, the connector fitting is removable quickly and easily from the receptacle by simple depression of the spring lever 26 and manual withdrawal of the fitting from the receptacle.

Figure 2:
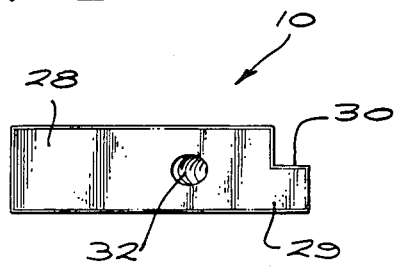
FIG. 2 is an enlarged right side elevation view of the lock-out plug.
Figure 3:
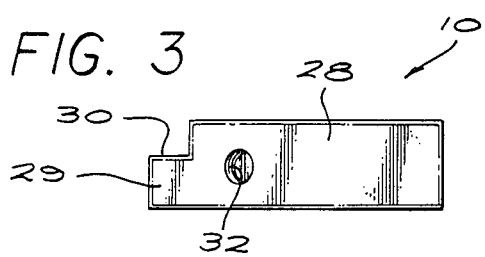
FIG. 3 is an enlarged left side elevation view of the lock-out plug.
Figure 4:
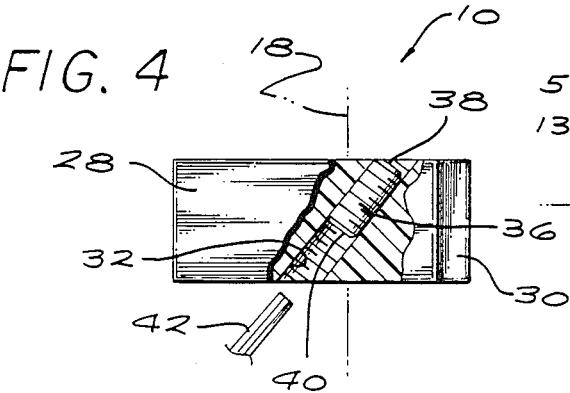
FIG. 4 is an exploded fragmented top plan view of the lock-out plug and depicting set screw operation between locked and unlocked positions.

The lock-out plug 10 of the present invention comprises a compact plug fitting 28 which may be conveniently molded or otherwise produced from a lightweight plastic, such as nylon plastic or the like. As shown in FIGS. 1-3, the plug fitting has a cross sectional size and shape corresponding generally with the connector fitting 16 for relatively snug sliding reception into the jack receptacle 20. In this regard, for optimum fit into the jack receptacle, the forward or leading end of the plug fitting preferrably includes a protruding lower lip 29 defining an upwardly present land 30, thereby closely simulating the configuration of the standard fitting 16 except that a spring lever 26 may be omitted from the plug fitting. Importantly, the overall length of the plug fitting is chosen so that a substantial portion of the plug fitting projects outwardly from the jack receptacle 20 when the plug fitting is received therein, as illustrated in FIG. 4.

In accordance with a primary aspect of the invention, the plug fitting 28 includes a transversely extending an angularly set threaded bore 32. This bore 32 is formed in any convenient manner, such as by drilling and tapping, to position the bore to bridge the plane of the wall plate 18 when the plug fitting is installed into the jack receptacle 20 (FIG. 4). More particularly, when the plug fitting is installed into the jack receptacle, one end of the threaded bore 32 is positioned within the jack receptacle adjacent one side wall 34 thereof, whereas the other end of the threaded bore 32 is open or exposed to the exterior of the jack.

A set screw 36 is threadably received within the bore 32 and has an overall length significantly less than the length of the bore. A forward end of the set screw 36 defines a locking tip 38 for engaging the side wall 34 of the jack receptacle 20. A rearward or head end of the set screw 36 defines a countersunk tool or key seat 40 for receiving the end of a suitably formed tool 42 to advance or retract the set screw within the threaded bore 32. Engagement of the tool 42 with the head end of the set screw 36 is permitted by insertion of the tool 42 into the externally exposed end of the bore, as shown in FIG. 4. While the geometry of the set screw head 40 and the associated tool 42 may comprise a standard Allen wrench geometry, a specialized nonstandard geometry is preferred, such as a triangular shape or the like, to avoid advancing or retracting of the set screw with the use of standard workshop tools.

In use, to block the jack receptacle 20 against plug-in connection with the connector fitting 16, the fitting 16 is initially removed from the jack to expose the jack receptacle. The plug fitting 28 is then seated firmly into the jack receptacle 20 with the set screw 36 appropriately retracted to a position entirely within the bore 32 for easy plug fitting insertion. The tool 42 is then engaged with the set screw head 40 to advance the set screw locking tip 38 into a secure binding engagement with the receptacle side wall 34. This binding engagement with the side wall 34 effectively prohibits manual withdrawal of the plug fitting 28 from the jack receptacle, and thereby effectively prevents the jack from being connected to any communication device. Of course, the tool 40 is removed from the plug fitting and appropriately stored in a safe place until plug fitting removal from the jack receptacle is desired, whereupon the set screw is retracted quickly and easily from the side wall 34 to permit easy manual removal of the plug fitting from the receptacle.

Figure 5:
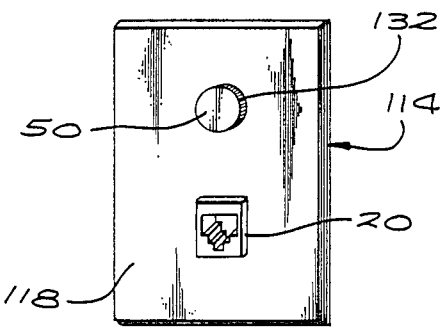
FIG. 5 is a perspective view illustrating one alternative form of the invention.
Figure 6:
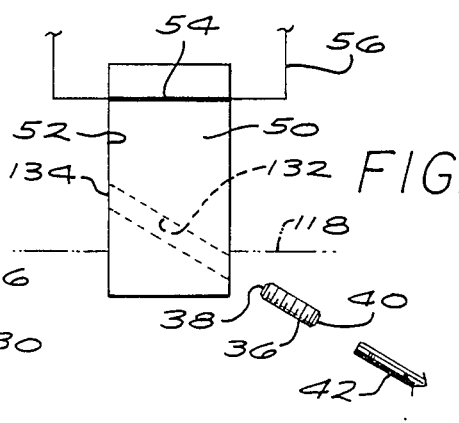
FIG. 6 is an exploded and somewhat schematic diagram depicting operation of the embodiment of FIG. 5.

One alternative embodiment of the invention is depicted in FIGS. 5 and 6 wherein the locking set screw 36 in incorporated into a specialized telephone outlet jack 114 having a standard jack receptacle 20 together with a plug-in conductive link 50 adapted for reception into a mating cavity 52. In this version, the conductive link 50 carries a conductor 54 for completing an electrical circuit with other conductor elements 56 when the conductive link 50 is installed into the cavity. However, when the conductive link 50 is removed from the cavity, the electrical circuit is interrupted such that the jack 114 is rendered inoperative.

The set screw 36 is carried by the conductive link 50 within a transversely extending and angularly set threaded bore 132 positioned to bridge the plane of a wall plate 118 when the conductive link is seated within the cavity 52. In this position, a rear or head end 40 of the set screw 36 is exposed to the exterior of the jack 114 for appropriate engagement by a mating key or tool 42. Once again, as described with respect to the embodiment of FIGS. 1-4, the geometry of the set screw head 40 and the mating tool 42 are specialized in nature to prevent set screw adjustments by the use of standard workshop tools. A locking tip 38 of the forward end of the set screw 36 is thus advanced quickly and easily into binding engagement with a side wall 134 of the cavity 52 to lock the conductive link 50 in place. When it is desired to render the jack 114 inoperative, the conductive link 50 may be removed quickly and easily from the jack by retracting the set screw 36 from the cavity side wall 138 and then withdrawing the link 50 from the cavity. The conductive link and tool may then be stored in a safe place until resumed use of the jack is desired.

The present invention thus provides a relatively simple and easy-to-use device for rendering a telephone outlet jack inoperative on a temporary basis. The plug fitting of the invention is installed and removed as desired with respect to the outlet jack. The use of a specialized operating tool geometry advantageously prevents such installation and removal with the use of standard tools which may be available to an unauthorized user.

A variety of modifications and improvements to the invention described herein will be apparent to those skilled in the art. Accordingly, no limitation on the invention is intended by way of the foregoing description and accompanying drawings, except as set forth in the appended claims.

What is claimed is:

1. A lock-out plug for preventing use of a telephone outlet jack including a jack receptacle having a cavity with a side wall at one side thereof, said lock-out plug comprising:
    a plug fitting having a size and shape for relatively snug sliding fit reception into the jack receptacle, said plug fitting having a threaded bore formed therein to extend generally transversely therethrough, said bore being angularly set in a position such that one end of said bore opens within said jack receptacle adjacent said side wall when said plug fitting is received into the jack receptacle, and the other end of the bore opens to the exterior of the jack receptacle when said plug fitting is received into the jack receptacle; and
    a lock member carried by said plug fitting for movement between a first position permitting said plug fitting to be inserted into and withdrawn from said jack receptacle, and a second position extending into binding engagement with said side wall of the jack receptacle when said plug fitting is received into the jack receptacle to prevent removal of said plug fitting from the jack receptacle.

2. The lock-out device of claim 1 wherein said lock member comprises a set screw threadably received end locking tip for binding engagement with the jack receptacle side wall, said set screw further having a head at a rearward end thereof, and further including a tool for insertion into said bore for engaging said head to advance and retract said set screw within said bore.

3. The lock-out device of claim 2 wherein said set screw head and said tool have mating nonstandard geometries.

4. A lock-out plug for insertion into an open jack receptacle of a standard telephone outlet jack having an open cavity with a side wall at at least one side thereof, said lock-out plug comprising:
    a compact plug fitting having a size and shape for relatively snug sliding fit reception into the jack receptacle;
    said plug fitting having a generally transversely extending and angularly set threaded bore formed therein, said bore having one end opening within said jack receptacle adjacent said side wall and an opposite end opening to the exterior of the jack receptacle when the plug fitting is received into the jack receptacle;
    a set screw threadably received into the bore and having a length less than the length of the bore, said set screw having a forward end locking tip for binding engagement with said side wall to lock said plug fitting into the jack receptacle, and a rearward head end defining a tool-engaging socket; and
    a tool having an operative end with a size and shape for mating engagement with said set screw socket, said tool operative end being insertable into the bore to engage the set screw socket to advance and retract said set screw within the bore.

5. A lockout plug for preventing unauthorized use of a telephone outlet jack having a standard jack receptacle for receiving a telephone jack fitting and a cavity for receiving a connection element rendering the telephone jack operational, said lock-out plug comprising:
    a plug member having a size and shape for relatively snug sliding fit reception into the cavity;
    said plug member having a generally transversely extending and angularly set threaded bore formed therein, said bore having one end opening within said side cavity adjacent a side wall thereof and an opposite end opening to the exterior of the cavity when the plug member is received in the cavity;
    a set screw threadably received into the bore and having a length less than the length of the bore, said set screw having a forward end locking tip for binding engagement with said side wall to lock said plug member into the cavity, and a rearward head end defining a tool-engaging socket; and
    a tool having an operative end with a size and shape for mating engagement with said set screw socket, said tool operative end being insertable insertable into the bore to engage the set screw socket to advance and retract said set screw within the bore;
    said plug member including a conductive link for completing an electrical circuit when said plug member is received into said cavity to render the jack operational.

* * * * *